US012614308B2

(12) United States Patent
Park et al.

(10) Patent No.: US 12,614,308 B2
(45) Date of Patent: Apr. 28, 2026

(54) METHOD AND APPARATUS FOR CAMERA-LIDAR CALIBRATION

(71) Applicants: Hyundai Motor Company, Seoul (KR); Kia Corporation, Seoul (KR)

(72) Inventors: Jin Ho Park, Seoul (KR); Jang Yoon Kim, Seoul (KR); Woong Hyun Ka, Seoul (KR); Jin Sol Kim, Hwaseong-si (KR); Keun Ho Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/636,840

(22) Filed: Apr. 16, 2024

(65) Prior Publication Data

US 2025/0182329 A1    Jun. 5, 2025

(30) Foreign Application Priority Data

Nov. 30, 2023    (KR) ........................ 10-2023-0171455

(51) Int. Cl.
| | |
|---|---|
| G06T 7/12 | (2017.01) |
| G01S 7/497 | (2006.01) |
| G06T 7/13 | (2017.01) |
| G06T 7/80 | (2017.01) |

(52) U.S. Cl.
CPC ................ G06T 7/80 (2017.01); G01S 7/497 (2013.01); G06T 7/12 (2017.01); G06T 7/13 (2017.01); G06T 2207/10028 (2013.01); *G06T*

2207/20081 (2013.01); *G06T 2207/20084* (2013.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 2021/0192788 A1* | 6/2021 | Diederichs | ............ | G01S 17/931 |
| 2022/0044034 A1* | 2/2022 | RoyChowdhury | ..... | E01C 23/01 |
| 2024/0371035 A1* | 11/2024 | Jadhav | .................... | G01S 17/86 |
| 2024/0426988 A1* | 12/2024 | Kim | ........................ | G01S 17/89 |

* cited by examiner

*Primary Examiner* — Samuel D Fereja
(74) *Attorney, Agent, or Firm* — Slater Matsil, LLP

(57) ABSTRACT

A method for camera-Lidar calibration includes acquiring an image captured by a camera at a specific time point and a Lidar point cloud captured by a Lidar and projected onto a camera coordinate system at the specific time point, extracting a ground edge image corresponding to an edge of a ground surface, from the image extracting a road mark point cloud representing a road mark on the ground surface, from the Lidar point cloud, generating a first variation indicating a predicted position variation by predicting a position variation of the road mark point cloud to the ground edge image, through a neural network, and calibrating the camera and the Lidar, based on the first variation.

20 Claims, 10 Drawing Sheets

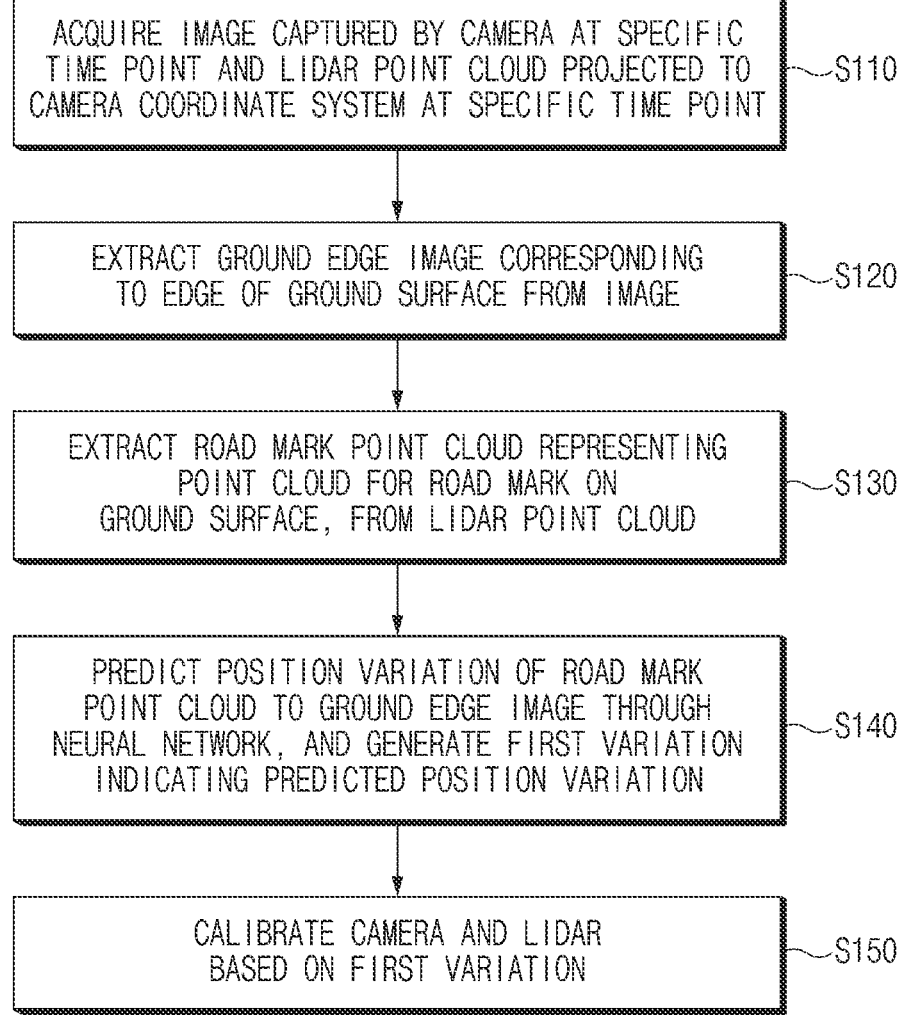

ACQUIRE IMAGE CAPTURED BY CAMERA AT SPECIFIC
TIME POINT AND LIDAR POINT CLOUD PROJECTED TO
CAMERA COORDINATE SYSTEM AT SPECIFIC TIME POINT  ~S110

EXTRACT GROUND EDGE IMAGE CORRESPONDING
TO EDGE OF GROUND SURFACE FROM IMAGE  ~S120

EXTRACT ROAD MARK POINT CLOUD REPRESENTING
POINT CLOUD FOR ROAD MARK ON
GROUND SURFACE, FROM LIDAR POINT CLOUD  ~S130

PREDICT POSITION VARIATION OF ROAD MARK
POINT CLOUD TO GROUND EDGE IMAGE THROUGH
NEURAL NETWORK, AND GENERATE FIRST VARIATION
INDICATING PREDICTED POSITION VARIATION  ~S140

CALIBRATE CAMERA AND LIDAR
BASED ON FIRST VARIATION  ~S150

FIG.1

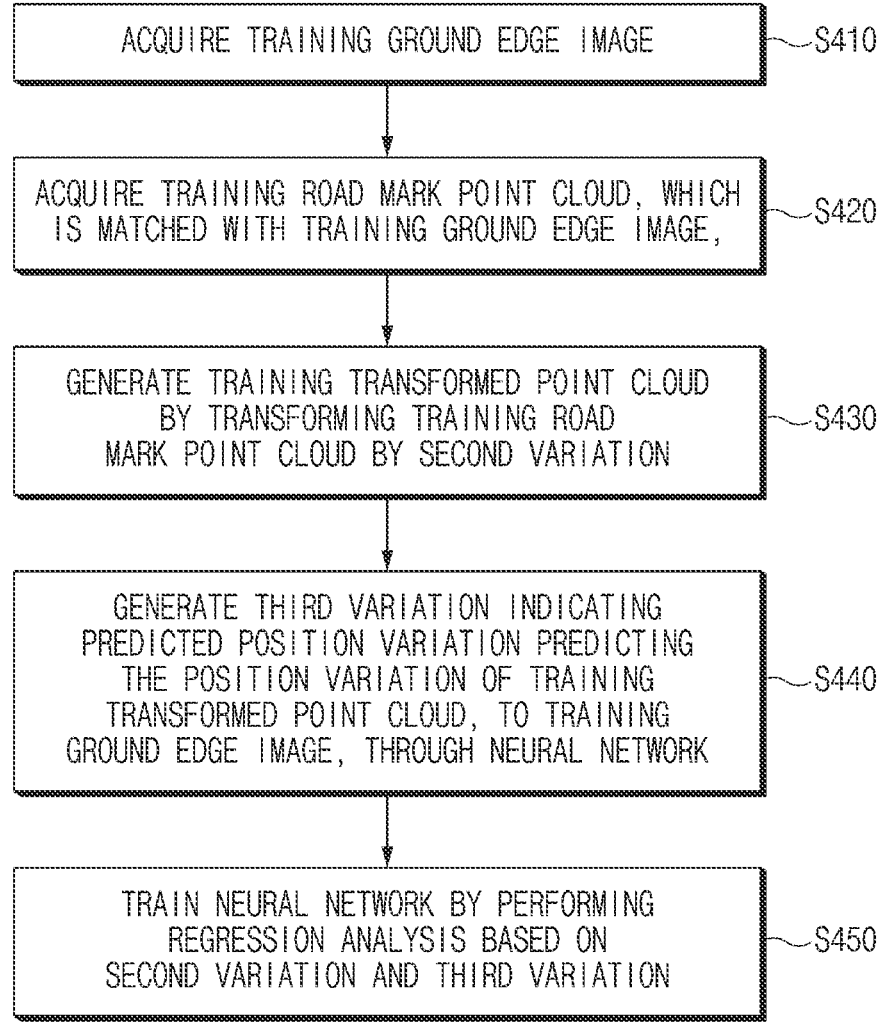

ACQUIRE TRAINING GROUND EDGE IMAGE ~S410

ACQUIRE TRAINING ROAD MARK POINT CLOUD, WHICH IS MATCHED WITH TRAINING GROUND EDGE IMAGE, ~S420

GENERATE TRAINING TRANSFORMED POINT CLOUD BY TRANSFORMING TRAINING ROAD MARK POINT CLOUD BY SECOND VARIATION ~S430

GENERATE THIRD VARIATION INDICATING PREDICTED POSITION VARIATION PREDICTING THE POSITION VARIATION OF TRAINING TRANSFORMED POINT CLOUD, TO TRAINING GROUND EDGE IMAGE, THROUGH NEURAL NETWORK ~S440

TRAIN NEURAL NETWORK BY PERFORMING REGRESSION ANALYSIS BASED ON SECOND VARIATION AND THIRD VARIATION ~S450

METHOD AND APPARATUS FOR CAMERA-LIDAR CALIBRATION

CROSS-REFERENCE TO RELATED APPLICATIONS

This application claims the benefit of Korean Patent Application No. 10-2023-0171455, filed on Nov. 30, 2023, which application is hereby incorporated herein by reference.

TECHNICAL FIELD

The present disclosure relates to a method and an apparatus for camera-Lidar calibration.

BACKGROUND

Recently, as a computer vision technology based on a deep neural network has been developed in an autonomous driving technology, studies and researches have been performed on various artificial intelligence (AI) models for object detection, semantic segmentation, depth map estimation, or lane detection.

Specifically, studies and researches have been continuously performed on a method for performing autonomous driving by inputting data, which is obtained by a camera, and data, which is obtained by a Lidar, into an AI model. However, since the camera and the Lidar are mutually different sensors, the camera and the Lidar may be mounted at mutually different positions in a vehicle, so a spatial calibration procedure is required. To resolve the spatial mismatching between heterogeneous sensors, an intrinsic parameter and an extrinsic parameter may be used. In addition, the camera and the Lidar may be different from each other in a time point for acquiring data or a time point for finishing data processing, so a temporally synchronizing work is required between the camera and the Lidar. To resolve the temporal mismatching between the heterogeneous sensors, special hardware may be used or the timestamp related to a time point for acquiring data for each sensor may be used.

SUMMARY

The present disclosure relates to a method and an apparatus for camera-Lidar calibration and, in particular embodiments, relates to a neural network design for the calibration between a camera and a Lidar, and a method and an apparatus for camera-Lidar calibration.

Embodiments provided in the present disclosure can solve problems occurring in the prior art while advantages achieved by the prior art are maintained intact.

An aspect of the present disclosure provides a method for compensating for the temporal mismatching between a camera and a Lidar, through a neural network, and an apparatus for the same.

Another aspect of the present disclosure provides a method for temporally synchronizing between a camera and a Lidar using the camera, the Lidar, and a processor provided inside a vehicle, without additional hardware, and an apparatus for the same.

Another aspect of the present disclosure provides a method for designing a neural network to temporally calibrate a camera and a Lidar and training the neural network, and an apparatus for the same.

Another aspect of the present disclosure provides a method for substituting the temporal mismatching between a camera and a Lidar into the spatial mismatching between the camera and the Lidar, and an apparatus for the same.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, a method for camera-Lidar calibration may include acquiring, by an acquiring device, an image captured by a camera at a specific time point and a Lidar point cloud projected onto a camera coordinate system at the specific time point, extracting, by an extracting device, a ground edge image corresponding to a edge of a ground surface, from the image, extracting, by the extracting device, a road mark point cloud representing a point cloud for a road mark on the ground surface, from the Lidar point cloud, generating, by a generating device, a first variation indicating a predicted position variation by predicting a position variation of the road mark point cloud to the ground edge image, through a neural network, and calibrating, by a calibrating device, the camera and a Lidar, based on the first variation.

According to an embodiment, the method may further include acquiring, by the acquiring device, a training ground edge image, acquiring, by the acquiring device, a training road mark point cloud matched with the training ground edge image, generating, by the generating device, a training transformed point cloud by transforming the training road mark point cloud by a second variation, generating, by the generating device, a third variation indicating a predicted position variation by predicting a variation of a position of the training transformed point cloud to the training ground edge image through the neural network, and training, by a training device, the neural network by performing a regression analysis, based on the second variation and the third variation.

According to an embodiment, the extracting of the road mark point cloud may include extracting, by the extracting device, the ground point cloud corresponding to the ground surface, from the Lidar point cloud, and extracting, by the extracting device, the road mark point cloud having intensity greater than or equal to a specific intensity, from the ground point cloud.

According to an embodiment, the extracting of the ground point cloud may include extracting, by the extracting device, the ground point cloud through a ground estimation algorithm.

According to an embodiment, the extracting of the ground point cloud may include extracting, by the extracting device, the ground point cloud through a normal estimation algorithm.

According to an embodiment, the extracting of the ground edge image may include generating, by the generating device, a grayscale image by transforming the image into a grayscale image, extracting, by the extracting device, an edge image by applying an edge filtering algorithm to the grayscale image, and extracting, by the extracting device, the ground edge image by setting the ground surface of the edge image as a region of interest (RoI) and cropping a remaining region of the edge image except for the region of interest.

According to an embodiment, the extracting of the ground edge image may include extracting, by the extracting device, the ground edge image by extracting a portion of a feature point of the image through the neural network.

According to an embodiment, the first variation may include an element of a rotation matrix and an element of a translation matrix, and the calibrating may include calibrating, by the calibrating device, the camera and the Lidar by multiplying coordinates of the road mark point cloud by an inverse matrix of the first variation.

According to an embodiment, the neural network may be a convolution neural network (CNN) or a multiplayer perception (MLP).

According to an embodiment, an apparatus for camera-Lidar calibration may include a camera, a Lidar, an acquiring device to acquire an image captured by a camera at a specific time point and a Lidar point cloud projected onto a camera coordinate system at the specific time point, an extracting device to extract a ground edge image corresponding to a edge of a ground surface, from the image, and to extract a road mark point cloud representing a point cloud for a road mark on the ground surface, from the Lidar point cloud, a generating device to generate a first variation indicating a predicted position variation by predicting a position variation of the road mark point cloud to the ground edge image, through a neural network, and a calibrating device to calibrate the camera and a Lidar, based on the first variation.

According to an embodiment, the acquiring device may acquire a training ground edge image and acquire a training road mark point cloud matched with the training ground edge image, the generating device may generate a training transformed point cloud by transforming the training road mark point cloud by a second variation, and generate a third variation indicating a predicted position variation by predicting a variation of a position of the training transformed point cloud to the training ground edge image through the neural network, and the apparatus may further include a training device to train the neural network by performing a regression analysis, based on the second variation and the third variation.

According to an embodiment, the extracting device may extract the ground point cloud corresponding to the ground surface, from the Lidar point cloud, and extract the road mark point cloud having intensity greater than or equal to a specific intensity, from the ground point cloud.

According to an embodiment, the extracting device may extract the ground point cloud through a ground estimation algorithm.

According to an embodiment, the extracting device may extract the ground point cloud through a normal estimation algorithm.

According to an embodiment, the generating device may generate a grayscale image by transforming the image into a grayscale image, and the extracting device may extract an edge image by applying an edge filtering algorithm to the grayscale image, and extract the ground edge image by setting the ground surface of the edge image as a region of interest (RoI) and cropping a remaining region of the edge image except for the region of interest.

According to an embodiment, the extracting device may extract the ground edge image by extracting a portion of a feature point of the image through the neural network.

According to an embodiment, the first variation may include an element of a rotation matrix and an element of a translation matrix, and the calibrating device may calibrate the camera and the Lidar by multiplying coordinates of the road mark point cloud by an inverse matrix of the first variation.

According to an embodiment, the neural network may be a convolution neural network (CNN) or a multiplayer perception (MLP).

The features of the present disclosure, which are briefly described, are provided as exemplary aspects of the detailed description of the present disclosure, which is to be described below, and the scope of the present disclosure is not limited thereto.

BRIEF DESCRIPTION OF THE DRAWINGS

The above and other objects, features and advantages of the present disclosure will be more apparent from the following detailed description taken in conjunction with the accompanying drawings:

FIG. 1 is a flowchart illustrating a method for camera-Lidar calibration, according to an embodiment of the present disclosure;

FIG. 4 is a flowchart illustrating a manner for training a neural network for camera-Lidar calibration, according to an embodiment of the present disclosure;

DETAILED DESCRIPTION OF ILLUSTRATIVE EMBODIMENTS

Figure 2:
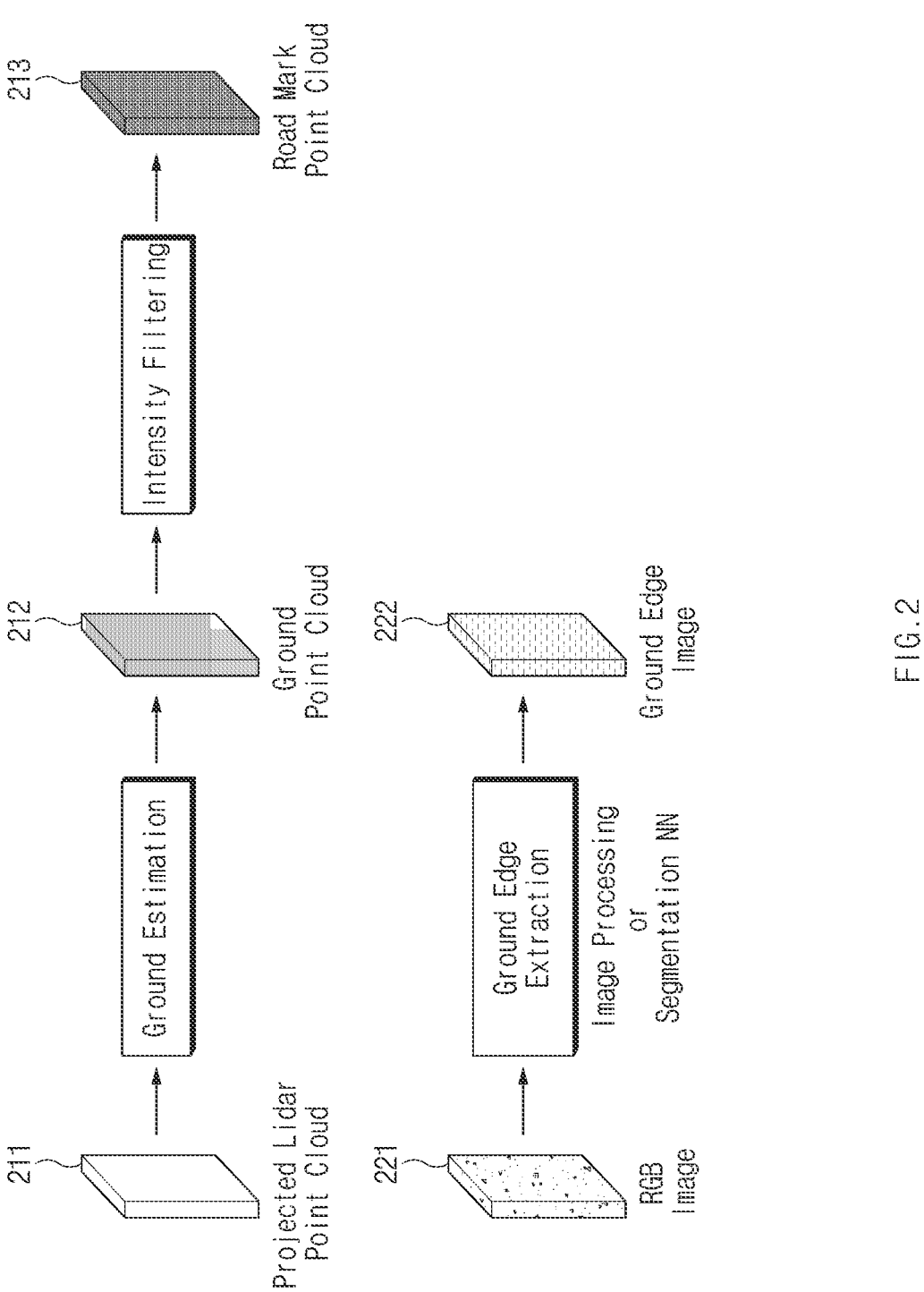
FIG. 2 is a view illustrating a pre-processing procedure for data in a method for camera-Lidar calibration, according to an embodiment of the present disclosure.

Hereinafter, the embodiment of the present disclosure will be described in detail with reference to accompanying drawings to allow those skilled in the art to easily reproduce the inventive concept. However, the present disclosure may be implemented in various forms, and is limited to embodiments described herein.

In the following description of the present disclosure, in the case where it is determined that the detailed description of a related known configuration or function may make the subject matter of the present disclosure unclear, the details thereof may be omitted. In addition, to clearly describe the present disclosure, a part, which is irrelevant to the present disclosure, is omitted, and similar reference numerals will be assigned to similar parts through the whole specification.

When a certain component is "linked to", "coupled to", or "connected with" another component, the certain part may be directly linked to or connected with the another component, and a third component may be electrically "linked", "coupled", or "connected" between the certain component and the another component. It will be understood that the terms "comprises," "comprising," "includes" and/or "including," when used herein, specify the presence of stated elements and/or components, but do not preclude the presence or addition of one or more other elements and/or components. In addition, when a certain component includes or has another component, another component is not excluded, but another component is further included unless specifically otherwise stated.

In the present disclosure, the terms "the first" and "the second" are used to distinguish between one component and another component. The terms "the first" and "the second" do not limit the sequence or the importance between components unless specifically otherwise stated. Accordingly, a "first component" according to an embodiment may be referred to as a "second component" according to another embodiment, and a "second component" according to an embodiment may be referred to as a "first component" according to another embodiment, within the scope of the present disclosure.

According to the present disclosure, components distinguished from each other are provided to distinctly describe the feature of each component, and does not refer to that the components are separated from each other. In other words, a plurality of components are integrated and implemented in one hardware or software unit. Alternatively, one component is split and implemented in unit of multiple hardware or software. Accordingly, unless specifically otherwise stated, even an embodiment having components provided integrally with each other or separately from each other is falling within the scope of the present disclosure.

In the present disclosure, components described according to various embodiments do not refer to essential components, and some of the components may be selectively provided. Therefore, an embodiment including a subset of components described according to an embodiment is included in the present disclosure. In addition, an embodiment additionally including another component in addition to components described according to various embodiments falls within the scope of the present disclosure.

In the present disclosure, the location relationship (for example, an upper portion, a lower portion, a left side, or a right side) expressed in the present specification is provided only for the illustrative purpose. When accompanying drawings of the present disclosure are inversely shown, the location relationship described in the present disclosure may be inversely interpreted.

In the present disclosure, each of the wordings "A or B," "at least one of A and B," "at least one of A or B," "A, B, or C," "at least one of A, B, and C," or "at least one of A, B, or C," and the like used herein may include any one and all combinations of items arranged together in a relevant wording of the wordings.

Hereinafter, embodiments of the present disclosure will be described with reference to FIGS. 1 to 9.

FIG. 1 is a flowchart illustrating a method for camera-Lidar calibration, according to an embodiment of the present disclosure.

A camera and a Lidar are mutually different sensors. A synchronization work is required between heterogeneous sensors, such that the heterogeneous sensors are used together. For example, the camera and the Lidar need to be spatially and temporally synchronized with each other.

The spatial mismatching between the heterogeneous sensors may be caused due to the difference in mounting position between sensors provided inside a vehicle and due to the mismatching between intrinsic coordinate systems of the sensors. The spatial mismatching between the heterogeneous sensors may be compensated by estimating an intrinsic parameter and an extrinsic parameter.

The temporal mismatching between the heterogeneous sensors may be caused due to the difference between sensors in terms of a time point for acquiring data or a time point for finishing data processing. For example, the Lidar sensor may be a sensor physically rotating, so data at a time point, in which the rotating angle of the Lidar sensor is 0° and data at a time point, in which the rotating angle of the Lidar sensor is 360°, may be different from a camera image. Specifically, on the assumption that the period of time of 0.9 seconds is taken for the Lidar to rotate at 360°, and an image is obtained through the camera at a time point at which 0.9 seconds are elapsed, the point cloud (Lidar point cloud) of the Lidar may be matched with the image of the camera at the time point at which 0.9 seconds are elapsed, but the Lidar point cloud at 0.1 second may not be matched with the camera image at 0.9 seconds.

The temporal mismatching between the heterogeneous sensors brings the use of the additional hardware for temporal synchronization or the use of timestamp related to the time point for acquiring data for each sensor. However, the estimation of the motion of Lidar points requires a more complex technology, as compared to compensating for the spatial mismatching between the sensors. In addition, when new hardware is used to resolve the temporal mismatching between the heterogeneous sensors, the issue of additional costs and the issue of the reliability for the hardware may be caused.

According to an embodiment of the present disclosure, the method for camera-Lidar calibration does not require additional hardware to resolve the temporal mismatching between the camera and the Lidar. In addition, according to an embodiment of the present disclosure, in the method for camera-Lidar calibration, the temporal mismatching between the camera and the Lidar is substituted into the spatial mismatching between the camera and the Lidar, such that the issue of the temporal mismatching may be resolved.

Referring to FIG. 1, according to an embodiment of the present disclosure, in the method for the camera-Lidar calibration, an image captured by the camera at a specific time point and a Lidar point cloud projected onto a camera coordinate system at the specific time point may be acquired in S110. In detail, an acquiring device may acquire the image captured by the camera at the specific time point and the Lidar point cloud projected onto the camera coordinate system at the specific time point. In the method for camera-Lidar calibration, the spatial mismatching between the camera and the Lidar may be resolved by acquiring the Lidar point cloud projected onto the camera coordinate system from a Lidar coordinate system. However, if the camera and the Lidar are not calibrated temporally, even if the image and the Lidar point cloud projected onto the camera coordinate system are acquired at the same time point, the Lidar point cloud projected onto the camera coordinate system may be mismatched from the image captured by the camera, when the Lidar point cloud projected onto the camera coordinate system is projected onto the image captured by the camera.

According to the method for camera-Lidar calibration, a ground edge image corresponding to the edge of the ground surface may be extracted from the image in S120. In detail, an extracting device may extract the ground edge image corresponding to the edge of the ground surface from the image. In addition, according to the method for camera-Lidar calibration, the image may be transformed into a grayscale image. In addition, according to the method for camera-Lidar calibration, the edge image may be extracted by applying an edge filtering algorithm to the grayscale image. In addition, according to the method for camera-Lidar calibration, the ground surface in the edge image may be set as a region of interest (RoI), and a remaining region of the edge image except for the RoI may be cropped, thereby extracting the ground image. In addition, according to the method for camera-Lidar calibration, the ground edge image may be extracted from the image through a neural network.

According to the method for camera-Lidar calibration, in S130, a road mark point cloud representing a point cloud for a road mark on the ground surface may be extracted from the Lidar point cloud. In detail, the extracting device may extract the road mark point cloud, which represents the point cloud for the road mark on the ground surface, from the Lidar point cloud.

The Lidar point cloud projected onto the camera coordinate system may include a static point cloud (for example, the ground surface, or the point cloud for the building) and a dynamic point cloud (for example, a vehicle, or a point cloud for a pedestrian). One consistent position transformation is applied to the static point cloud, which is not matched with the image, due to the temporal mismatching between the camera and the Lidar, such that the image is matched with the transformed point cloud, thereby resolving the temporal mismatching between the camera and the Lidar. In other words, as the temporal mismatching between the camera and the Lidar is substituted into the spatial mismatching between the camera and the Lidar, thereby easily resolving the temporal mismatching between the camera and the Lidar.

According to the method for camera-Lidar calibration, the ground point cloud corresponding to the ground surface may be extracted from the Lidar point cloud. In other words, according to the method for camera-Lidar calibration, at least a portion of the static point cloud may be extracted from the Lidar point cloud. In addition, according to the method for camera-Lidar calibration, a ground estimation algorithm may be employed to extract only a ground point cloud corresponding to the ground surface, from the Lidar point cloud. In addition, according to the method for camera-Lidar calibration, the ground point cloud may be extracted through a normal estimation algorithm. For example, the method for camera-Lidar calibration may include extracting the ground point cloud from the Lidar point cloud by extracting points having values allowing a normal vector to approximate (0, 0, 1). However, the normal vector is not limited to (0, 0, 1). For example, various vectors may be employed as the normal vectors, as long as the vectors correspond to the normal line to the ground surface.

In addition, according to the method for camera-Lidar calibration, a road mark point cloud having the intensity greater than or equal to a specific intensity may be extracted from the ground point cloud. Specifically, the road mark may be typically expressed in brighter color such as white color, a portion, which corresponds to the road mark, of the ground point cloud may have intensity greater than that of the ground surface (for example, asphalt). Accordingly, if the point cloud having the intensity greater than or equal to the specific intensity is filtered from the ground point cloud, the point cloud for the road mark may be extracted.

According to the method for camera-Lidar calibration, in S140, a position variation of the road mark point cloud to the ground edge image is predicted through a neural network, and a first variation indicating the predicted position variation is generated. Specifically, a generating device may predict the position variation of the road mark point cloud to the ground edge image through the neural network and generate the first variation indicating the predicted position variation. Since the camera and the Lidar are not temporally calibrated, the ground edge image and the road mark point cloud may not be matched with each other. Therefore, according to the method for camera-Lidar calibration, the neural network is trained to predict the position variation of the road mark point cloud to the ground edge image. The first variation indicating the predicted position variation may be expressed in the form of a matrix. In detail, the first variation may have a matrix including an element of a rotation matrix and an element of a translation matrix.

$$\begin{bmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{bmatrix} \qquad \text{Equation 1}$$

A matrix including elements $r_{11}$ to $r_{33}$ and elements $t_1$ to $t_3$ of Equation 1 may be an example for the first variation. Among the elements of the first variation, $r_{11}$ to $r_{33}$ may correspond elements of the rotation matrix, and $t_1$ to $t_3$ may correspond to elements of the translation matrix.

The neural network may be a convolution neural network (CNN) or a multilayer perception (MLP), but the present disclosure is not limited thereto.

To train the neural network, according to the method for camera-Lidar calibration, a ground edge image (or a training ground edge image) for training may be acquired. In addition, according to the method for camera-Lidar calibration, a road mark point cloud (or a training road mark point cloud) for training may be acquired to be matched with the training ground edge image. In addition, according to the method for camera-Lidar calibration, the training road mark point cloud is transformed by a second variation to generate a transformed point cloud (or a training transformed point cloud) for training. In addition, to perform a data augmentation work for training data, the training road mark point cloud matched with the training ground edge image is transformed by the second variation to generate the training transformed point cloud. In this case, the second variation may be arbitrarily determined within a preset range.

In addition, according to the method for camera-Lidar calibration, a position variation of the training transformed point cloud to the training ground edge image is predicted through the neural network and a third variation indicating the predicted position variation is generated.

In addition, according to the method for camera-Lidar calibration, a regression analysis may be performed based on the second variation and the third variation, thereby training the neural network. The details related to the training of the neural network will be described later.

According to the method for camera-Lidar calibration, in S150, the camera and the Lidar may be calibrated based on the first variation. In detail, a calibrating device may calibrate the camera and the Lidar, based on the first variation. According to the method for camera-Lidar calibration, the camera and the Lidar may be calibrated by multiplying the coordinates of the points of the road mark point cloud by an inverse matrix of the first variation. The coordinates of the points of the road mark point cloud, which is not matched with the ground edge image, may be multiplied by the inverse matrix of the first variation, such that the ground edge image is matched with the road mark point cloud, which is inversed. As the ground edge image is matched with the road mark point cloud, which is inversed, the camera and the Lidar may be temporally calibrated.

FIG. 2 is a view illustrating a pre-processing procedure for data in the method for camera-Lidar calibration, according to an embodiment of the present disclosure.

To temporally calibrate the camera and the Lidar, data obtained by the camera and data obtained by the Lidar need to be pre-processed.

In general, a driving environment is dynamic. Accordingly, if one transformation is consistently applied to the Lidar point cloud projected onto the camera coordinate system, the mismatching between the Lidar point cloud and the image captured by the camera may not be resolved. As described above, the Lidar point cloud projected onto the camera coordinate system may include a static point cloud (for example, a ground surface, a point cloud for a building) and a dynamic point cloud (for example, a vehicle or a point cloud for a pedestrian). One consistent transformation is applied to the static point cloud to resolve the temporal mismatching between the static point cloud and the image may be resolved. Accordingly, the temporal mismatching between the camera and the Lidar may be resolved by extracting portions corresponding to the ground surface from the point cloud by the Lidar and the image captured by the camera. However, with respect to the entire point cloud corresponding to the ground surface and the entire ground image, it may be difficult to find out a feature point to determine whether the entire point cloud corresponding to the ground surface is matched with the entire ground image.

For the ground surface, a feature point may be easily extracted from a lane, or a road surface marking. Specifically, point cloud of a portion, which is painted, on the asphalt, may have intensity greater than intensity of the asphalt. Accordingly, a road mark point cloud 213, which is a point cloud corresponding to the road mark, may be extracted from a Lidar point cloud 211 projected onto the camera coordinate system. The Lidar point cloud projected onto the camera coordinate system may be used to resolve the spatial mismatching between the camera and the Lidar.

A ground point cloud 212 may be extracted from the Lidar point cloud 211 projected onto the camera coordinate system by applying the ground estimation algorithm to the Lidar point cloud 211. In addition, although not illustrated, the ground point cloud 212 may be extracted from the Lidar point cloud 211 projected onto the camera coordinate system by applying a normal estimation algorithm to the Lidar point cloud 211.

If only the ground point cloud is extracted as described above, the feature point for the matching with the image may be not found. Accordingly, the road mark point cloud 213 may be extracted from the ground point cloud 212. In detail, the road mark point cloud 213 may be extracted by extracting a point cloud having the intensity greater than or equal to a specific intensity, from the ground point cloud 212.

To compare with the road mark point cloud 213, a ground edge image 222, which is an image corresponding to the edge of the ground, may be extracted from an image 221 captured by the camera. To extract the ground edge image 222 from the image 221, an image processing manner for converting an image to a grayscale image and extracting an edge from the grayscale image may be applied. In addition, the ground edge image may be directly extracted through the neural network.

Figure 3:
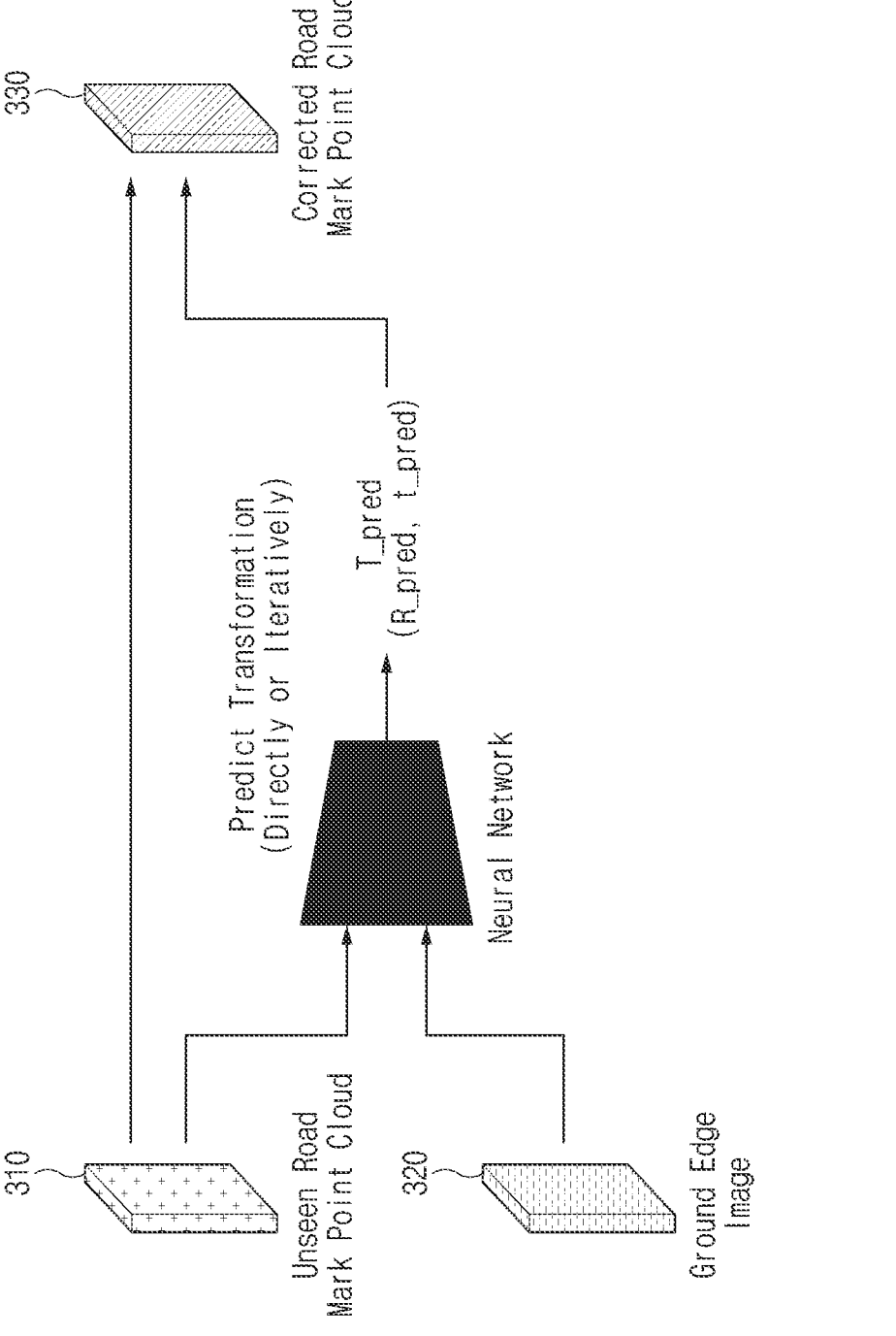
FIG. 3 is a view illustrating a method for camera-Lidar calibration, according to an embodiment of the present disclosure.

FIG. 3 is a view illustrating a method for camera-Lidar calibration, according to an embodiment of the present disclosure.

Referring to FIG. 3, a road mark point cloud 310 and a ground edge image 320 may be input to a neural network. In addition, the neural network may predict a first variation T_pred corresponding to the difference in position between the road mark point cloud 310 and the ground edge image 320. As described above, the first variation T_pred may be a matrix including an element R_pred of the rotation matrix and an element t_pred of the movement matrix.

The first variation may be predicted at once, or may be predicted several times, through the neural network. Specifically, the neural network may predict at least a portion of the variation (position variation) in the position between the road mark point cloud 310 and the ground edge image 320 several times. For example, the neural network may predict a (1-1)-th variation, which is at least a portion of the variation in the position between the road mark point cloud 310 and the ground edge image 320. In addition, the neural network may predict a (1-2)-th variation, which is at least a portion of the position variation, after predicting the (1-1)-th variation. In addition, the neural network may predict a (1-3)-the variation, which is at least a portion of the position variation, after predicting the (1-2)-th variation. On the assumption that up to the (1-3)-th variation is predicted, the equation of "the first variation=(the (1-1)-th variation)*(the (1-2)-th variation)*(the (1-3)-th variation)" may be established.

The road mark point cloud 310 is inversely transformed based on the predicted first variation, thereby obtaining a road mark point cloud 330 matched with the ground edge image 320. In other words, the camera and the Lidar may be temporally calibrated. In detail, according to the method for camera-Lidar calibration, points of the road mark point cloud are multiplied by the inverse matrix of the first variation, such that the camera and the Lidar are calibrated.

FIG. 4 is a flowchart illustrating a method for training a neural network for camera-Lidar calibration, according to an embodiment of the present disclosure.

Referring to FIG. 4, in the method for camera-Lidar calibration according to an embodiment of the present disclosure, the neural network may be trained to predict the difference in position between the ground edge image and the road mark point cloud.

In detail, according to the method for camera-Lidar calibration, in S410, a ground edge image (training ground edge image) for training may be acquired. In detail, the acquiring device may acquire the training ground edge image.

In addition, according to the method for camera-Lidar calibration, in S420, a road mark point cloud (training road mark point cloud) for training, which is matched with the training ground edge image, may be acquired. In detail, the acquiring device may acquire the training road mark point cloud which is matched with the training ground edge image.

In addition, according to the method for camera-Lidar calibration, in S430, the training transformed point cloud may be generated by transforming the training road mark point cloud by the second variation. In detail, the generating device may generate the training transformed point cloud by transforming the training road mark point cloud by the second variation. According to the method for camera-Lidar calibration, data for training may be generated by intentionally transforming the training road mark point cloud, which is matched with the training ground edge image, for augmenting data.

According to the method for camera-Lidar calibration, in S440, the third variation indicating the predicted position variation may be generated by predicting the position variation of the training transformed point cloud, to the training ground edge image, through the neural network. In detail, the generating device may generate the third variation indicating the predicted position variation, by predicting the position variation of the training transformed point cloud to the training ground edge image, through the neural network. The third variation may be a value predicted by the neural network and may be different from the second variation.

According to the method for camera-Lidar calibration, in S450, the neural network may be trained by performing a regression analysis based on the second variation and the third variation. In detail, the training device may train the neural network by performing the regression analysis based on the second variation and the third variation.

Figure 5:
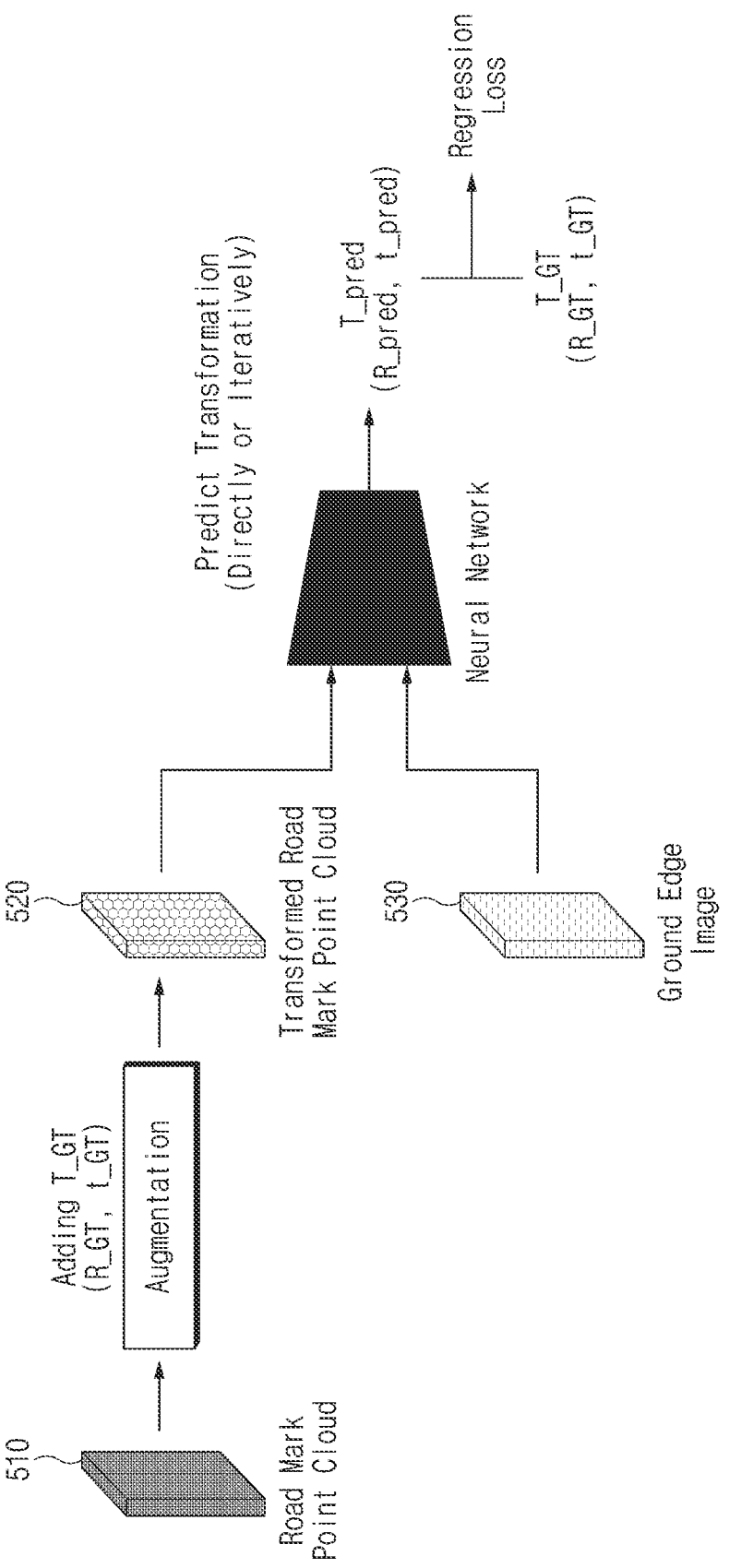
FIG. 5 is a view illustrating a manner for training a neural network for camera-Lidar calibration, according to an embodiment of the present disclosure.

FIG. 5 is a view illustrating a manner to train the neural network to perform camera-Lidar calibration, according to an embodiment of the present disclosure.

Referring to FIG. 5, the neural network according to an embodiment of the present disclosure, may be designed to predict the third variation T_pred, based on a training transformed road mark point cloud 520 and a training ground edge image 530. The third variation may be a matrix corresponding to the difference in position between the training transformed point cloud 520 and the training ground edge image 530. In detail, the third variation may be a matrix including an element R_pred of the rotation matrix and an element t_pred of the movement matrix.

According to an embodiment of the present disclosure, in the method for camera-Lidar calibration, the training road mark point cloud 510 may be transformed into the training transformed point cloud 520 for data augmentation. In detail, the training transformed point cloud 520 may be generated by transforming the training road mark point cloud 510 by the second variation T_GT. The second variation may be a matrix including an element R_GT of the rotation matrix and an element t_GT of the movement matrix, which is similar to the third variation In detail, according to the method for camera-Lidar calibration, the neural network may be trained by performing the regression analysis based on the second variation and the third variation.

Figure 6:
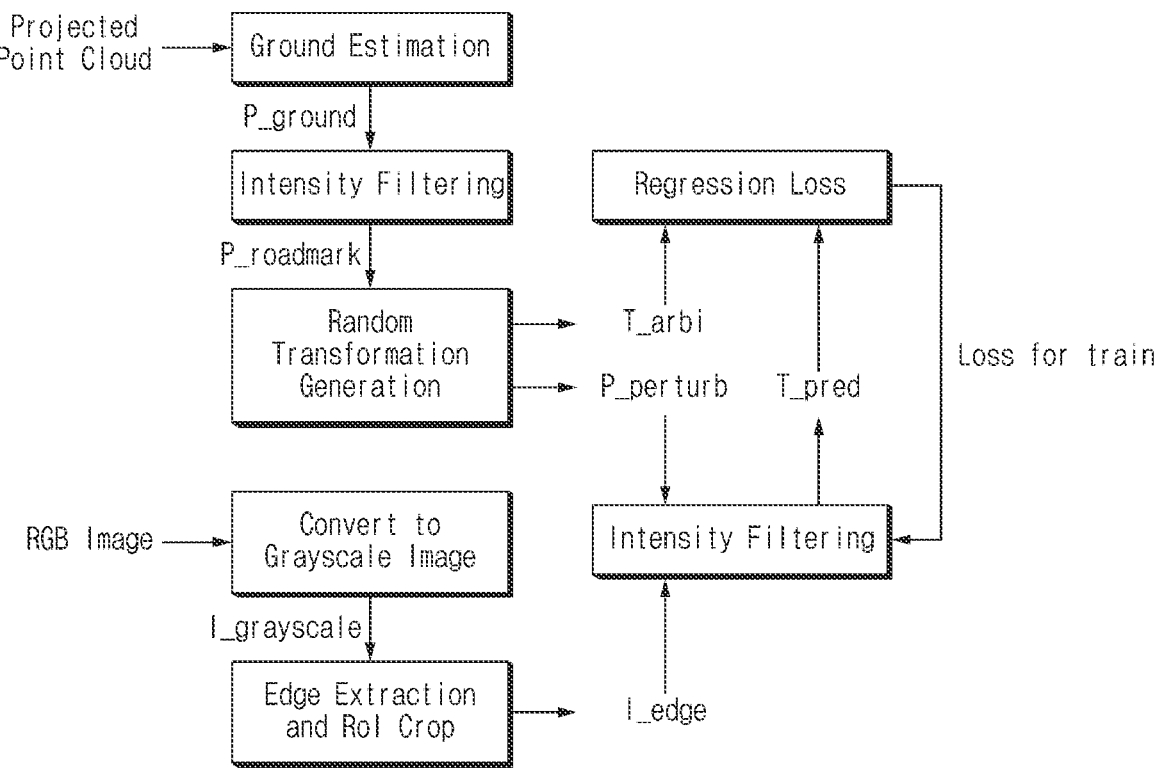
FIG. 6 is a view illustrating a manner for training a neural network for camera-Lidar calibration, according to an embodiment of the present disclosure.

FIG. 6 is a view illustrating a manner to train the neural network to perform camera-Lidar calibration, according to an embodiment of the present disclosure.

Referring to FIG. 6, according to an embodiment of the present disclosure, in the method for camera-Lidar calibration, the ground estimation algorithm may be applied to the Lidar point cloud (projected point cloud) matched with the image and projected onto the camera coordinate system, thereby generating the training ground point cloud P_ground. The normal estimation algorithm may be applied to extract the training ground point cloud from the training Lidar point cloud, in addition to the ground estimation algorithm.

According to the method for camera-Lidar calibration, the training road mark point cloud P_roadmark may be extracted from the training ground point cloud by performing an intensity filtering (reflectance filtering).

In addition, according to the method for camera-Lidar calibration, the training transformed point cloud P_perturb may be generated by transforming the training road mark point cloud by a random second variation T_arbi.

In addition, according to the method for camera-Lidar calibration, a training image (RGB image) captured by the camera may be converted into a training grayscale image I_grayscale.

In addition, according to the method for camera-Lidar calibration may generate the training ground edge image I_edge by extracting the edge of the training grayscale image and by cropping a portion excluding the ground surface which is the RoI.

In addition, the neural network may be trained by receiving inputs of the training transformed point cloud and the training ground edge image, such that the third variation T_pred is predicted. In detail, the neural network may be trained by performing the regression analysis based on the second variation and the third variation.

Figure 7A:
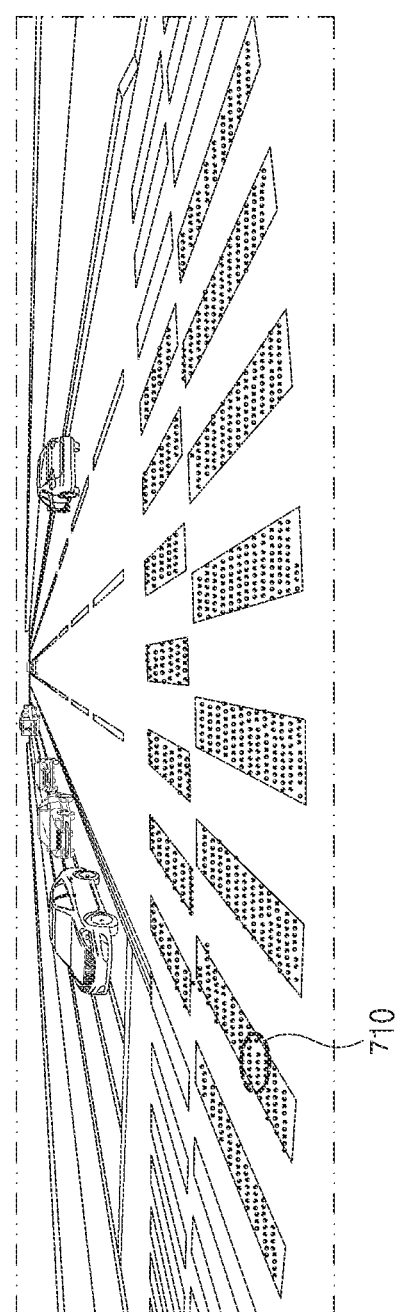
FIG. 7A is a view illustrating a method for camera-Lidar calibration, according to an embodiment of the present disclosure.

FIG. 7A is a view illustrating a method for camera-Lidar calibration, according to an embodiment of the present disclosure.

Referring to FIG. 7A, it may be recognized that the training road mark point cloud and the training edge image are expressed. According to an embodiment of the present disclosure, in the method for camera-Lidar calibration, although the training ground edge image matched with the training road mark point cloud is used, the edge image of the vehicle and the edge image of the ground surface are expressed together, such that FIG. 7A is understood.

Referring to FIG. 7A, it may be recognized that the training edge image is matched with the training road mark point cloud, which is illustrated as in reference numeral 710.

Figure 7B:
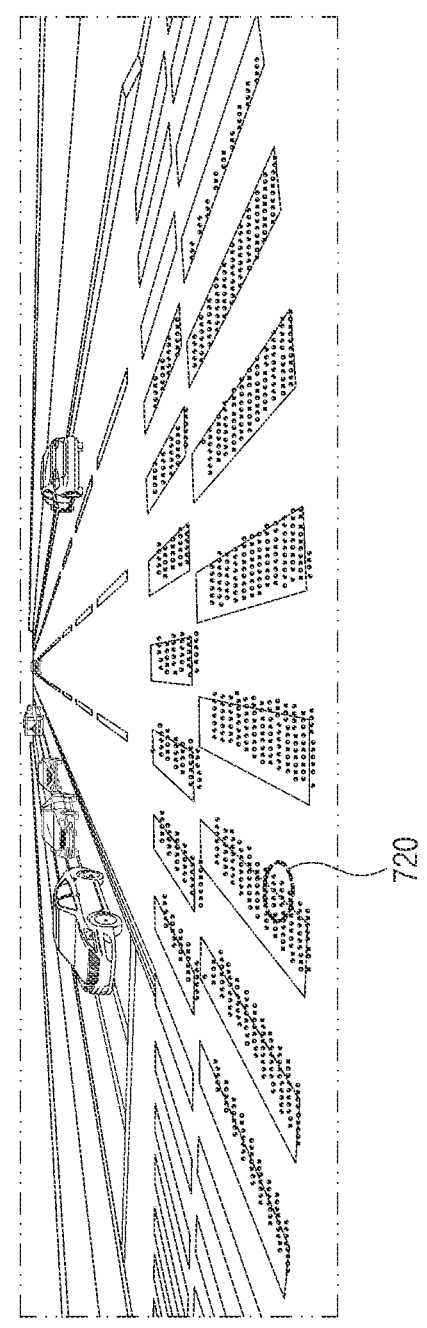
FIG. 7B is a view illustrating a method for camera-Lidar calibration, according to an embodiment of the present disclosure.

FIG. 7B is a view illustrating a method for camera-Lidar calibration, according to an embodiment of the present disclosure.

Referring to FIG. 7B, it may be recognized that the training transformed point cloud and the training edge image are expressed. According to an embodiment of the present disclosure, in the method for camera-Lidar calibration, although the training ground edge image matched with the training road mark point cloud is used, the edge image of the vehicle and the edge image of the ground surface are expressed, such that FIG. 7B is understood.

Referring to FIG. 7B, it may be recognized that the training edge image is not matched with the training road mark point cloud, which is illustrated as in reference numeral 720. In detail, according to an embodiment of the present disclosure, in the method for camera-Lidar calibration, data augmentation may be performed by changing the training road mark point cloud matched with the training edge image by the second variation. In other words, the training road mark point cloud is transformed by the second variation to generate the training transformed point cloud. The training transformed point cloud may not be matched with the training edge image through the transformation based on the second variation.

Figure 8:
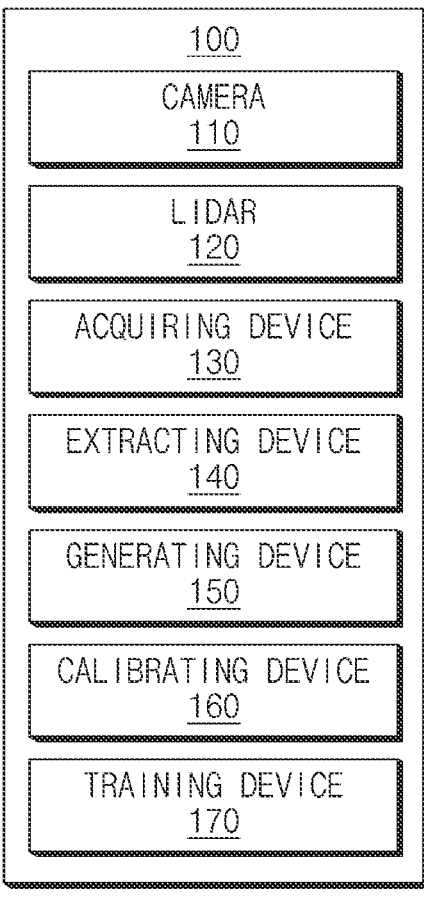
FIG. 8 is a block diagram illustrating an apparatus for camera-Lidar calibration, according to an embodiment of the present disclosure.

FIG. 8 is a block diagram illustrating an apparatus for camera-Lidar calibration, according to an embodiment of the present disclosure.

According to an embodiment of the present disclosure, an apparatus 100 for camera-Lidar calibration may include a camera 110, a Lidar 120, an acquiring device 130, an extracting device 140, a generating device 150, a calibrating device 160, and a training device 170.

The acquiring device 130 may be configured to acquire an image captured by the camera 110 at a specific time point and the Lidar point cloud projected onto the camera coordinate system at the specific time point. However, even if the acquiring device 130 acquires the image at the specific time point and the Lidar point cloud projected onto the camera coordinate system at the specific time point when the camera and the Lidar are not temporally calibrated, if the Lidar point cloud projected onto the camera coordinate system is projected onto the image captured by the camera, the Lidar point cloud projected onto the camera coordinate system may not be matched with the image captured by the camera.

In addition, the acquiring device 130 may be configured to acquire the training ground edge image and acquire the training road mark point cloud matched with the training ground edge image.

The extracting device 140 may extract the ground edge image corresponding to the edge of the ground surface, from the image, and may extract the road mark point cloud indicating the point cloud for the road mark on the ground surface, from the Lidar point cloud.

In detail, the extracting device 140 may be configured to extract the ground point cloud corresponding to the ground surface, from the Lidar point cloud, and extract the road mark point cloud having intensity greater than or equal to the specific intensity, from the ground point cloud.

In addition, the extracting device 140 may be configured to extract the ground point cloud through the ground estimation algorithm.

In addition, the extracting device 140 may be configured to extract the ground point cloud through the normal estimation algorithm.

In addition, the extracting device 140 may be configured to extract the edge image through an edge filtering algorithm for the grayscale image, set the ground surface of the edge image as a RoI, and cropping a remaining region of the edge image except for the RoI, thereby extracting the ground edge image.

In addition, the extracting device 140 may be configured to extract the ground edge image by extracting a portion of a feature point of the image through the neural network.

The generating device 150 may be configured to generate the first variation indicating the predicted position variation by predicting the position variation of the road mark point cloud to the ground edge image through the neural network. In detail, the first variation may be a matrix including an element of the rotation matrix and an element of the movement matrix.

In addition, the generating device 150 may be configured to generate the training transformed point cloud by transforming the training road mark point cloud by the second variation, and to predict the position variation of the training transformed point cloud for the training ground edge image through the neural network, thereby generating the third variation indicating the position variation.

In addition, the generating device 150 may be configured to generate the grayscale image by transforming the image into the grayscale image.

The calibrating device 160 may be configured to calibrate the camera 110 and the Lidar 120 based on the first variation.

In addition, the calibrating device 160 may be configured to calibrate the camera and the Lidar by multiplying coordinates of the points of the road mark point cloud by the inverse matrix of the first variation.

In detail, the training device 170 may train the neural network by performing the regression analysis based on the second variation and the third variation.

Figure 9:
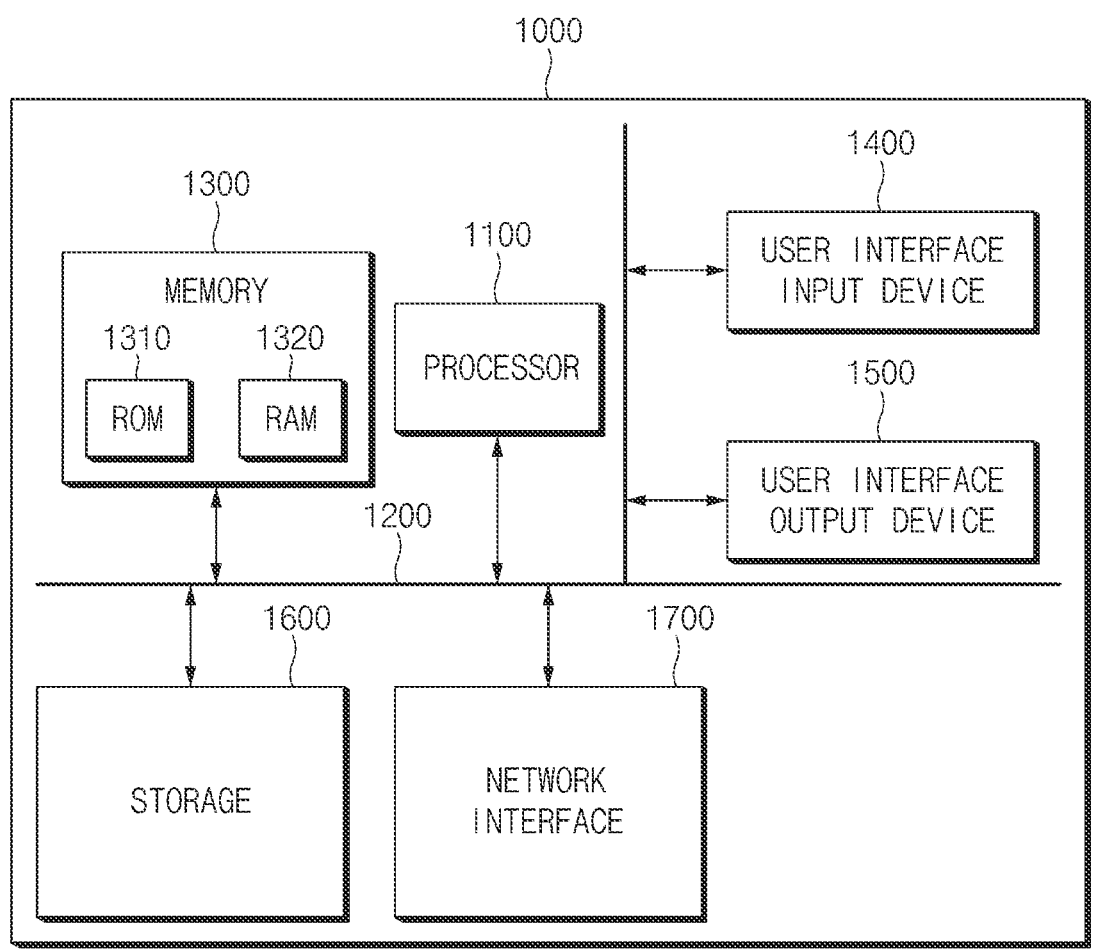
FIG. 9 is a block diagram of a computing system to execute camera-Lidar calibration, according to an embodiment of the present disclosure.

FIG. 9 is a block diagram of a computing system to execute the method for camera-Lidar calibration, according to an embodiment of the present disclosure.

The acquiring device 130, the extracting device 140, the generating device 150, the calibrating device 160, and the training device 170 may correspond to the processor.

Referring to FIG. 9, the method for camera-Lidar calibration according to an embodiment of the present disclosure may be implemented through a computing system. a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600.

Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

As described above, according to the present disclosure, the temporal mismatching between the camera and the Lidar may be compensated by using the neural network.

According to the present disclosure, temporally synchronizing between the camera and the Lidar may be performed using the camera, the Lidar, and a processor provided inside the vehicle, without additional hardware.

According to the present disclosure, the neural network to temporally calibrate the camera and the Lidar may be designed and the neural network may be trained.

According to the present disclosure, the temporal mismatching between the camera and the Lidar may be substituted into the spatial mismatching between the camera and the Lidar, and the spatial mismatching may be resolved, thereby resolving the temporal mismatching between the camera and the Lidar.

According to the present disclosure, the point cloud corresponding to the ground surface may be effectively handled, and the data set may be automatically formed to perform quantitative evaluation of semantic segmentation for estimating distance of depth of a road mark such as road information of a lane or a road surface.

The effects obtained according to the present disclosure are not limited to the aforementioned effects, and any other technical effects not mentioned herein will be clearly understood from the detailed description by those skilled in the art to which the present disclosure pertains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for camera LiDAR calibration, the method comprising:

receiving an image captured by a camera at a specific time point;

receiving a LiDAR point cloud captured by a LiDAR and projected onto a camera coordinate system at the specific time point;

extracting, from the image, a ground edge image corresponding to an edge of a ground surface;

extracting, from the LiDAR point cloud, a road mark point cloud representing a road mark on the ground surface;

generating, by a neural network, a first variation indicating a predicted position variation by predicting a position variation of the road mark point cloud to the ground edge image;

calibrating, based on the first variation, the camera and the LiDAR, wherein the neural network is trained based on:

receiving a training ground edge image;

receiving a training road mark point cloud matched with the training ground edge image;

generating a training transformed point cloud by transforming the training road mark point cloud by a second variation;

generating, by the neural network, a third variation indicating a predicted position variation by predicting a variation of a position of the training transformed point cloud to the training ground edge image; and training, based on the second variation and the third variation, the neural network by performing a regression analysis, wherein the first variation comprises an element of a rotation matrix and an element of a translation matrix, and wherein the calibrating comprises calibrating the camera and the LiDAR based on coordinates of the road mark point cloud and the first variation.

2. The method of claim 1, wherein extracting the road mark point cloud comprises:

extracting a ground point cloud corresponding to the ground surface, from the LiDAR point cloud; and extracting the road mark point cloud having an intensity greater than or equal to a specific intensity from the ground point cloud.

3. The method of claim 2, wherein extracting the ground point cloud comprises extracting the ground point cloud through a ground estimation algorithm.

4. The method of claim 2, wherein extracting the ground point cloud comprises extracting the ground point cloud through a normal estimation algorithm.

5. The method of claim 1, wherein extracting the ground edge image comprises:

generating a grayscale image by transforming the image into the grayscale image;

extracting an edge image by applying an edge filtering algorithm to the grayscale image; and extracting the ground edge image by setting the ground surface of the edge image as a region of interest (RoI) and cropping the remaining region of the edge image except for the RoI.

6. The method of claim 1, wherein extracting of the ground edge image comprises extracting the ground edge image by extracting a portion of a feature point of the image through the neural network.

7. The method of claim 1, wherein calibrating comprises calibrating the camera and the LiDAR by multiplying coordinates of the road mark point cloud by an inverse matrix of the first variation.

8. The method of claim 1, wherein the neural network is a convolutional neural network (CNN) or a multiplayer perception (MLP).

9. An apparatus for camera LiDAR calibration, the apparatus comprising:

a camera;

a LiDAR;

a processor;

an acquiring device configured to receive an image captured by the camera at a specific time point and a LiDAR point cloud captured by the LiDAR and projected onto a camera coordinate system at the specific time point;

an extracting device configured to extract a ground edge image corresponding to a edge of a ground surface, from the image, and to extract a road mark point cloud representing a point cloud for a road mark on the ground surface, from the LiDAR point cloud;

a generating device configured to generate a first variation indicating a predicted position variation by predicting a position variation of the road mark point cloud to the ground edge image, through a neural network;

a calibrating device configured to calibrate the camera and the LiDAR, based on the first variation, wherein the first variation comprises an element of a rotation matrix and an element of a translation matrix, wherein the calibrating device is configured to calibrate the camera and the LiDAR based on coordinates of the road mark point cloud and the first variation, wherein the acquiring device is configured to receive a training ground edge image and acquire a training road mark point cloud matched with the training ground edge image, and wherein the generating device is configured to:

generate a training transformed point cloud by transforming the training road mark point cloud by a second variation, and generate a third variation indicating a predicted position variation by predicting a variation of a position of the training transformed point cloud to the training ground edge image through the neural network; and a training device configured to train the neural network by performing a regression analysis, based on the second variation and the third variation.

10. The apparatus of claim 9, wherein the extracting device is configured to extract a ground point cloud corresponding to the ground surface, from the LiDAR point cloud, and extract the road mark point cloud having an intensity greater than or equal to a specific intensity from the ground point cloud.

11. The apparatus of claim 10, wherein the extracting device is configured to extract the ground point cloud through a ground estimation algorithm.

12. The apparatus of claim 10, wherein the extracting device is configured to extract the ground point cloud through a normal estimation algorithm.

US 12,614,308 B2

17

13. The apparatus of claim 9,
wherein the generating device is configured to generate a grayscale image by transforming the image into the grayscale image, and
wherein the extracting device is configured to:
extract an edge image by applying an edge filtering algorithm to the grayscale image; and
extract the ground edge image by setting the ground surface of the edge image as a region of interest (RoI) and cropping the remaining region of the edge image except for the RoI.

14. The apparatus of claim 9, wherein the extracting device is configured to extract the ground edge image by extracting a portion of a feature point of the image through the neural network.

15. The apparatus of claim 9, wherein the calibrating device is configured to calibrate the camera and the LiDAR by multiplying coordinates of the road mark point cloud by an inverse matrix of the first variation.

16. The apparatus of claim 9, wherein the neural network is a convolutional neural network (CNN) or a multiplayer perceptron (MLP).

17. An apparatus for camera LiDAR calibration, the apparatus comprising:
a camera;
a LiDAR;
a processing system including a processor and a non-transitory computer-readable storage medium storing a program to be executed by the processor, the program including instructions for:
receiving an image captured by the camera at a specific time point;
receiving a LiDAR point cloud captured by the LiDAR and projected onto a camera coordinate system at the specific time point;
extracting from the image a ground edge image corresponding to an edge of a ground surface;
extracting from the LiDAR point cloud a road mark point cloud representing a road mark on the ground surface;

generating a first variation indicating a predicted position variation by predicting a position variation of the road mark point cloud to the ground edge image, through a neural network;
calibrating the camera and the LiDAR, based on the first variation,
wherein the neural network is trained based on:
receiving a training ground edge image;
receiving a training road mark point cloud matched with the training ground edge image;
generating a training transformed point cloud by transforming the training road mark point cloud by a second variation;
generating a third variation indicating a predicted position variation by predicting a variation of a position of the training transformed point cloud to the training ground edge image through the neural network; and
training the neural network by performing a regression analysis, based on the second variation and the third variation,
wherein the first variation comprises an element of a rotation matrix and an element of a translation matrix, and
wherein the calibrating comprises calibrating the camera and the LiDAR based on coordinates of the road mark point cloud and the first variation.

18. The apparatus of claim 17, wherein extracting the road mark point cloud comprises:
extracting a ground point cloud corresponding to the ground surface from the LiDAR point cloud; and
extracting the road mark point cloud having an intensity greater than or equal to a specific intensity, from the ground point cloud.

19. The apparatus of claim 18, wherein extracting the ground point cloud comprises extracting the ground point cloud through a ground estimation algorithm.

20. The apparatus of claim 18, wherein the extracting of the ground point cloud comprises extracting the ground point cloud through a normal estimation algorithm.

* * * * *